United States Patent [19]

Okamoto et al.

[11] Patent Number: 4,625,076

[45] Date of Patent: Nov. 25, 1986

[54] SIGNED DOCUMENT TRANSMISSION SYSTEM

[75] Inventors: Tatsuaki Okamoto, Yokosuka; Shoji Miyaguchi, Yokohama; Akira Shiraishi; Tsukasa Kawaoka, both of Yokosuka, all of Japan

[73] Assignee: Nippon Telegraph & Telephone Public Corporation, Tokyo, Japan

[21] Appl. No.: 710,253

[22] Filed: Mar. 11, 1985

[30] Foreign Application Priority Data

Mar. 19, 1984 [JP] Japan .................................. 59-52696
Mar. 4, 1985 [JP] Japan .................................. 60-42052

[51] Int. Cl.$^4$ ............................................. H04L 9/00
[52] U.S. Cl. ............................. 178/22.11; 178/22.09; 178/22.08
[58] Field of Search ................ 178/22.11, 22.09, 22.08

[56] References Cited

U.S. PATENT DOCUMENTS 4,218,582  8/1980  Hellman et al. .................. 178/22.11

OTHER PUBLICATIONS

"Digitalized Signatures and Public–Key Functions as Intractable as Factorization", by Michael O. Rabin, Jan. 1979, Massachusetts Institute of Technology Laboratory for Computer Science.

*Primary Examiner*—Salvatore Cangialosi
*Assistant Examiner*—Aaron J. Lewis
*Attorney, Agent, or Firm*—Pollock, Vande Sande and Priddy

[57] ABSTRACT

On the transmitting side, a signature corresponding to a document to be transmitted is generated using a random number and the document as variables and on the basis of a congruent polynomial of second or higher degree with respect to the random number, secret key information and public key information produced based on the secret key information. The signature and the document are transmitted in digital form. On the receiving side, the congruent polynomial is operated using the received signature and document in place of the random number and the document employed on the transmitting side, and the validity of the received signature and document is verified on the basis of the result of the operation and the public key information.

25 Claims, 9 Drawing Figures

SIGNED DOCUMENT TRANSMISSION SYSTEM

BACKGROUND OF THE INVENTION

The present invention relates to a signed document transmission system which transmits digital data of a document, along with digital data indicating a signature attached thereto, and permits the receiving side to verify the validity of the signature and the document.

In transmitting a document in the form of digital data, it is relatively easy to partly or wholly falsify the document, and/or to change the signer thereto, and in addition, it is generally impossible for the receiving side to learn such changes.

In view of the above, such a system has been proposed that processes digital data for transmission on the transmitting side and permits the receiving side to verify the validity of the received document and signature in the form of digital data. This system is commonly referred to as a signed document transmission system.

Known conventional signed document transmission systems include one that employs common ciphers, represented by DES (Data Encryption Standard) (S. M. Matyas, "Digital Signatures—An Overview", Computer Networks, Vol. 3, No. 2, pp 87-94, 1978) and one that employs public keys, represented by the so-called RSA method (R. L. Rivest, "A Method for Obtaining Digital Signatures and Public-Key Cryptosystems", Communication on ACM, Vol. 2, No. 2, pp 120-126, 1978). The former system using common ciphers possesses the defects of complexity in the procedures for signature generation and verification and a large amount of data to be stored on the side of verification. On the other hand, the latter system using public keys (hereinafter referred to as the RSA method) is the most typical one in terms of safety and simplicity of procedures but has the drawback of low processing speed. To get around this problem, a system employing a hashing technique (hereinafter referred to as the hybrid system) has also been proposed (D. W. Davies, "Applying the RSA Digital Signature to Electronic Mail", IEEE COMPUTER Fed., pp 55-62, 1983), but this system encounters difficulty in increasing the processing speed for a signature to a short document.

SUMMARY OF THE INVENTION

It is therefore an object of the present invention to provide a signed document transmission system which is comparable to the prior art RSA method in terms of safety, simplicity of procedures and the length of a signature and permits generation and verification of the signature at higher speed than the conventional RSA method.

According to the present invention, secret key information and public key information are used for signature generations and verifications in the same manner as the case of the conventional RSA method. A person D in charge of drawing up a document to be transmitted keeps the secret keys and prepares the public keys based on the secret keys. The public key information and a name of the person corresponding thereto (or his identification code) are preregistered, for example, in a public register book. On the transmitting side, the responsible person D generates a signature corresponding to the document to be transmitted based on the secret keys and a polynomial which uses a random number and the document as variables and which is of second or higher order with respect to the random number variable. Then the signature and the document are transmitted. These processes are all performed in digital form. In some cases, the signature and the document are stored in various digital data storages, as will be described later.

On the receiving side, in order to check the validity of the received signature and document, they are used for the polynomial in place of the document to be transmitted and the aforesaid public key information used for the polynomial in the transmitting side.

PRINCIPLES OF THE INVENTION

Prime numbers p and q (where $p>q$) are used as the secret keys. The prime numbers p and q are similar to those in public key $n=pq$ according to the RSA method. Based on the prime numbers p and q, public keys n, $\delta$, $\epsilon$ and $\gamma$ are prepared, where $n=p^2q$, $1 \leq \delta \leq \theta(n^{\frac{1}{3}})$, $\theta(N)$ meaning a comparable order of N, $\epsilon = \theta(n^{\frac{1}{3}})$ and $\gamma = \theta(n/T)$, T being a value approximately in the range of $10^{10}$ to $10^{30}$. The correspondence between the holder D of the secret keys p and q and the public key information is made public in advance.

The signature generation starts with the production of a random number x (where $1 \leq x \leq pq-1$) and obtaining W and V which satisfy the following expressions (1) and (2):

$$Z \leq Wpq + V\epsilon\delta < Z + \delta \quad (1)$$

$$Z = -g(m) - \{f(x, m)(\bmod n)\} \quad (2)$$

where m is a document to be transmitted, g(m) is an arbitrary function with respect to m and $$f(x, m) = \sum_{i=0}^{I} f_i(m) \cdot x^i \quad (3)$$

where $I \geq 2$ and $f_i(m)$ is an arbitrary function with respect to m. That is, $f(x, m)(\bmod n)$ is a congruent polynomial which uses the random number x and the document m as variables and is of second or higher degree with respect to x, and (mod n) is an operation to modulus n and it always holds that $0 \leq f(x, m)(\bmod n) < n$; for example, when the value of f(x, m) is an integral multiple of n, the remainder is zero. The method for obtaining W and V will be described later.

After obtaining W which satisfies the abovesaid condition, the following operations are performed:

$$y = \frac{W}{f'(x, m)} \ (\bmod \ p) \quad (4)$$

$$f'(x, m) = \frac{df(x, m)}{dx} = \sum_{i=1}^{I} f_i(m) \cdot i \cdot x^{i-1} \quad (4')$$

Further, the following operation is performed:

$$S = x + ypq \quad (5)$$

Then, S is used as a signature corresponding to the document m to be transmitted. The document m and the signature S are transmitted.

On the receiving side, the following operation for verification expressed by equation (6) is performed using the received document m and signature S based on the public keys n, $\delta$ and $\epsilon$ of the signer D who signed the transmitted document.

$$\left[\frac{g(m) + \{f(s, m)(\bmod n)\}}{\delta}\right] = 0 \, (\bmod \, \epsilon) \quad (6)$$

where [A] represents the greatest integer equal to or smaller than A.

Further, the following expression (7) is examined:

$$\gamma \leqq S \leqq n - \gamma \quad (7)$$

When S does not satisfy expression (7), the result of verification by expression (6) is ignored. The reason for this is that the signature S, if shorter than $\gamma$ can easily be forged by the third party. The receiving side preknows the congruent polynomial of expression (3) and the function g(m) for the abovesaid verification. Further, from information indicating the signer D, sent along with the document m, or by some other means, the receiving side learns that the received document was sent from the signer D, and then carries out the above verification to make sure that document was transmitted certainly from the signer D and was not forged.

PROOF OF VERIFICATION OF EXPRESSION (6)

Substitution of the relations of expressions (5) and (3) into f(S, m)(mod n) gives $$f(S, m)(\bmod n) = f(x + ypq, m)(\bmod n)$$

$$= \sum_{i=0}^{I} f_i(m) \cdot (x + ypq)^i (\bmod n)$$

(since all the terms containing $n = p^2q$ become zero because of an operation to modulus n)

$$= \sum_{i=1}^{I} f_i(m) x^i + \sum_{i=1}^{I} f_i(m) \cdot i \cdot x^{i-1} \cdot ypq(\bmod n)$$

(from expressions (3) and (4))

$$= f(x, m) + f'(x, m) \cdot ypq(\bmod n) \quad (8)$$

From expression (4) it follows that $f'(x, m) \cdot y = W(\bmod p)$. Multiplying both sides thereof by pq gives $$f'(x, m) \cdot ypq = Wpq(\bmod n)$$

Substitution of this into expression (8) gives $$f(S, m) \, (\bmod n) \quad (9)$$

$$= f(x, m) + Wpq(\bmod n)$$

$$= \{f(x, m) \, (\bmod n)\} + Wpq$$

On the other hand, expression (1) is transformed as follows:

$$Z - V\epsilon\delta \leqq Wpq < Z - V\epsilon\delta + \delta$$

Adding $g(m) + \{f(x, m)(\bmod n)\}$ to each term of the above expression and using the relation of expression (9) with respect to Wpq, the following expression is obtained:

$$g(m) + \{f(x, m) \, (\bmod n)\} + Z - V\epsilon\delta$$

$$\leqq g(m) + \{f(S, m) \, (\bmod n)\}$$

$$< g(m) + \{f(x, m) \, (\bmod n)\} + Z - V\epsilon\delta + \delta.$$

Substitution of the relation of expression (2) into the above expression gives $$-V\epsilon\delta \leqq g(m) + \{f(S, m)(\bmod n)\} < -V\epsilon\delta + \delta.$$

Dividing both sides by $\delta$ gives $$-V\epsilon \leqq \frac{g(m) + \{f(S, m) \, (\bmod n)\}}{\delta} < -V\epsilon + 1.$$

Since the middle term of the above expression is intermediate between $-V\epsilon$ and $-V\epsilon + 1$, the greatest integer equal to or smaller than the value of the middle term is expressed by $$\left[\frac{g(m) + \{f(S, m)(\bmod n)\}}{\delta}\right] = -V\epsilon.$$

Accordingly, performing a modulo-$\epsilon$ operation with respect to the above, the following is obtained:

$$\left[\frac{g(m) + \{f(S, m)(\bmod n)\}}{\delta}\right] = 0 \, (\bmod \, \epsilon).$$

Thus, when the result of verification by expression (6) is zero, it is proved that the signature S was attached by the signer and that the received document was not falsified, thus verifying the validity of the signature and the document. That is, the person who can generate the signature S is only the responsible person D who has the secret keys p, q, and since the signature S is generated corresponding to the document to be transmitted, the aboveasaid relation could not be obtained, that is, the result of verification by expression (6) would not become zero, if wrong secret key information is used and/or if the document to be transmitted is forged.

DESCRIPTION OF THE PREFERRED EMBODIMENTS

Figure 1:
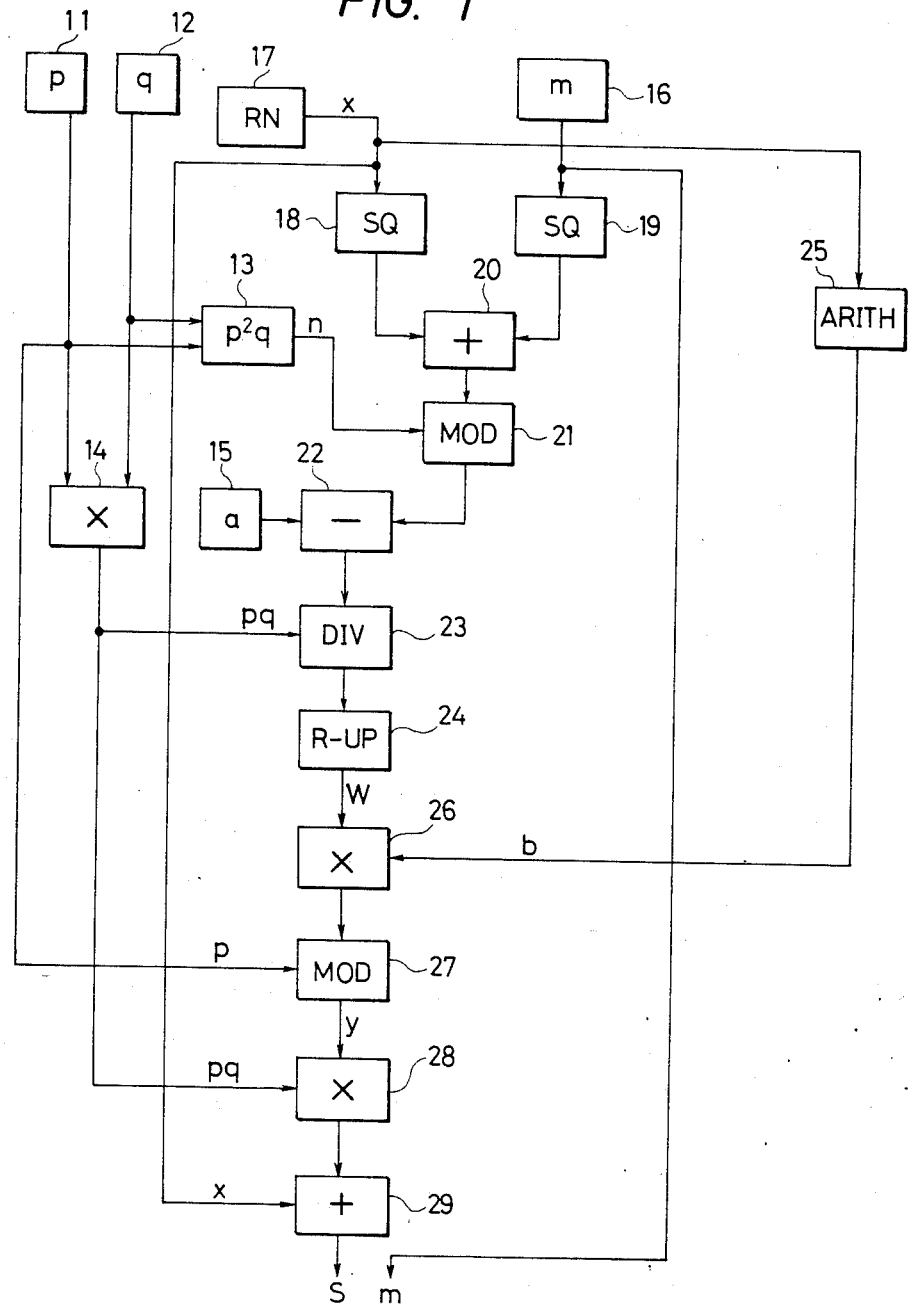
FIG. 1 is a block diagram illustrating an example of the arrangement of the signature generating side according to the present invention in the case of $f(x, m) = m^2 + x^2$.

With reference to the drawings, embodiments of the present invention will hereinafter be described. In the first embodiment, the aforementioned public key $\delta$ is selected to be of the order of $n^{\frac{2}{3}}$, the function g(m) is selected to be $-a$ (where a is an arbitrary integer) and it is selected that $f(x, m) = x^2 + m^2$. FIG. 1 illustrates in block form the arrangement for the procedure of generation of the signature S according to the first embodiment. Sufficiently large prime numbers p and q of, for example, decimal numbers of 50 to 100 digits are set in secret key setting registers 11 and 12, respectively. In this case, the prime number p is greater than q. In a multiplier 13 is generated $p^2q = n$ and in a multiplier 14 is generated pq. Further, an operation $\delta = [n^{\frac{2}{3}}]$ is performed, though not shown, and the arbitrary integer a, which satisfies $0 \leq a \leq n - \delta$, is set in a setting register 15, generating $\gamma$ which satisfies $\gamma \geq [n/10^{30}]$, though not shown. In this case, [A] represents the smallest integer equal to or larger than A. These n, $\delta$, a and $\gamma$ are preregistered as public key information belonged to the signer D in a register book. The above procedure, once taken at the beginning, need not be repeated afterward. The random number x, which satisfies the following condition, is obtained from a random number generator 17:

$$0 < x \leq pq - 1 \tag{10}$$

where $x \neq 0 \pmod{p}$ and $x \neq 0 \pmod{q}$. Next, with respect to the random number x and the document m to be transmitted, the following operation is performed by square operating units 18 and 19, an adder 20 and a modulo-n residue operating unit 21:

$$f(x, m)(\bmod n) = (x^2 + m^2)(\bmod n) \tag{11}$$

This $f(x, m)(\bmod n)$ and the a in the setting register 15 are subtracted one from the other in a subtractor 22. The result of the subtraction is divided by the pq from the multiplier 14 in a divider 23, and the result of this division is applied to a round-up operating unit 24, from which is obtained $$W = [\{a - f(x, m)(\bmod n)\}/pq] \tag{12}$$

On the other hand, with respect to the random number x, a value b which satisfies $$2xb = 1(\bmod p) \tag{13}$$

that is, a reciprocal of $$f'(x, m) = \frac{d(m^2 + x^2)}{dx} = 2x,$$

is obtained by an arithmetic unit 25 which operates to derive a reciprocal of a congruent expression in accordance with the extended Euclidean algorithm. The operation by the extended Euclidean algorithm is described in detail in Ako. A. V et al, "The Design and Analysis of Computer Algorithms", Addson-Wesley.

Next, the following operation $$y = b \cdot W(\bmod p) \tag{14}$$

corresponding to expression (4) is performed by a multiplier 26 and a modulo-p residue operating unit 27. Further, the y and pq are multiplied by a multiplier 28, and the result of multiplication is added with the x in an adder 29 to obtain $$S = x + ypq \tag{15}$$

The transmitting side transmits the signature S and the document m to the receiving side, along with the identification number (ID).

Next, a description will be given, with reference to FIG. 2, of the procedure for signature verification on the receiving side. The verification procedure starts with reading out the public key information (a, n, $\delta$ and $\gamma$) from the public register book on the basis of the identification number ID of the transmitting side and setting the public keys in setting registers 31, 32, 33 and 34, respectively. The public keys a and $\delta$ are added together by an adder 35 in advance. Then the received document m and signature S are subjected to a square operation by square operating units 36 and 37, respectively, and their outputs are added together by an adder 38. The result of this addition is provided to a residue operating unit 39, wherein it is subjected to a modulo-n operation, obtaining $$k = f(m, S)(\bmod n) = (m^2 + S^2)(\bmod n) \tag{16}$$

Then the value k of expression (16) is compared by a comparator 41 with the values a and $a + \delta$, respectively, and if $a \leq k < a + \delta$, then an affirmation is made. Further, the difference $n - \gamma$ between n and $\gamma$ is obtained by a subtractor 42 in advance, and the value of the signature S is compared by a comparator 43 with $\gamma$ and $n - \gamma$. If $\gamma \leq S \leq n - \gamma$, then an affirmation is made. In the event that the comparators 41 and 43 both make such an affirmation, it is decided that the received document and signature, i.e. (m, S), were generated certainly by the person D registered with the information (a, n, $\delta$ and $\gamma$) on the public register book, and a decider 40 outputs the verification result to that effect. Substracting a from each side of the following verification expression $$a \leq k = \{S^2 + m^2\}(\bmod n) < a + \delta \tag{17}$$

and dividing it by $\delta$ give $$0 \leq \frac{-a + \{(S^2 + m^2)(\bmod n)\}}{\delta} < 1 \tag{18}$$

obtaining $$\left[\frac{-a + \{(S^2 + m^2)(\bmod n)\}}{\delta}\right] = 0 \tag{19}$$

It will be understood that this expression (19) satisfies the verification expression (6). Accordingly, the arrangement for verification in this case is not limited specifically to the arrangement shown in FIG. 2 but may also be one that employs expression (18) or (19).

Incidentally, in the signature generation procedure in FIG. 1, since the generation of the random number x and the reciprocal b is not related to the value of the document m, they may also be produced before the document m is input into the signature generating system. This permits high-speed signature generation after inputting of the document m. Further, in FIG. 2, $n-\gamma \geq S \geq \gamma$ is checked in the signature verification procedure, but this check may also be replaced by a checking of the numbers of 0s succeeding the most significant digits of S and (N−S). In this case, the number $p$ of 0s that may succeed the most significant digit is used as the public key $\gamma$. Where $\gamma \geq [n/10^{30}]$, $\rho \leq 100$.

In the above, if the document m to be transmitted is very long, the document m may be divided into a series of document sections $m_j$ so as to satisfy the following expression:

$$0 \leq m_j \leq n-1,$$

where $j = 1, 2, \ldots$.

Figure 3:
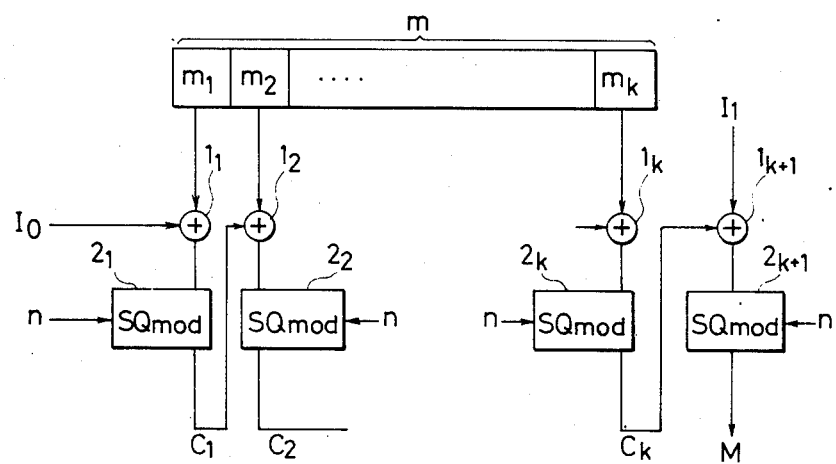
FIG. 3 is a block diagram illustrating an example of a hash processor for hashing the document m.

Each document section $m_j$ is processed in the same manner as explained previously to produce a signature $S_j$, and these $m_j$ and $S_j$ are transmitted. In this case, however, since each document section $m_j$ to be transmitted is added with the signature $S_j$ of the same length as $m_j$, the total amount of data of the signed document would become twice the amount of data of the document to be transmitted. With a view to reducing the amount of data transmitted, it is also possible to hash the document m to be transmitted and to generate the signature S using the hashed document $M = h(m)$. The document hashing can be achieved by a method disclosed in the aforementioned literature by D. W. Davies, or in D. W. Davies and W. L. Price, "Digital Signatures—An Update", Proceedings of 7th ICCC, pp. 845–849, 1984. For example, the document m is divided into $m_1, m_2, \ldots m_k$ in units of $[\log_2 n]$ bits and the hashed document $h(m)$ is defined using the following relations:

$$C_0 = I_0$$

$$C_j = (m_j \oplus C_{j-1})^2 (\text{mod } n), j = 1, 2, \ldots, k$$

$$h(m) = (C_k \oplus I_1)^2 (\text{mod } n)$$

where $I_0$ and $I_1$ are values that are determined by the system or the transmitting person. The hashed document $h(m)$ is obtained in the following manner. For example, as shown in FIG. 3, the respective document sections $m_1$ to $m_k$ are provided to exclusive OR circuits $1_1$ to $1_k$, the outputs of which are applied to modulo-n congruent square operating units $2_1$ to $2_k$, and their outputs $C_1$ to $C_k$ are supplied to exclusive OR circuits $1_2$ to $1_{k+1}$, respectively. The exclusive OR circuit $1_1$ is given $I_0$ as $C_0$ and the exclusive OR circuit $1_{k+1}$ is given $I_1$. The output of the latter is subjected to a modulo-n square operation by the congruent square operating unit $2_{k+1}$, deriving the hashed document $M = h(m)$ at its output.

For obtaining the signature S, it is necessary only to use the hashed document M in place of each m in g(m) and f(x, m) in expression (2) and $f_i(m)$ in expression (3) and to replace the corresponding m in each of the other expressions with M. The receiving side needs only to obtain $M = h(m)$ from the received document m by the same method as employed on the transmitting side and to use M in place of m in each verification expression.

SECOND EMBODIMENT

The first embodiment has shown a specific example of f(x, m), whereas in the second embodiment it is selected that $f(x, m) = f(x)$ (where f(x) is a polynomial of second or higher degree with respect to x), $g(m) = -M = -h(m)$ and the public key $\delta$ is $\theta(n^{\frac{2}{3}})$. The key $\epsilon$ is unnecessary. W in expression (1) is obtained by the following expression (20):

$$W = \left[ \frac{h(m) - \{f(x)(\text{mod } n)\}}{pq} \right] \tag{20}$$

Figure 4:
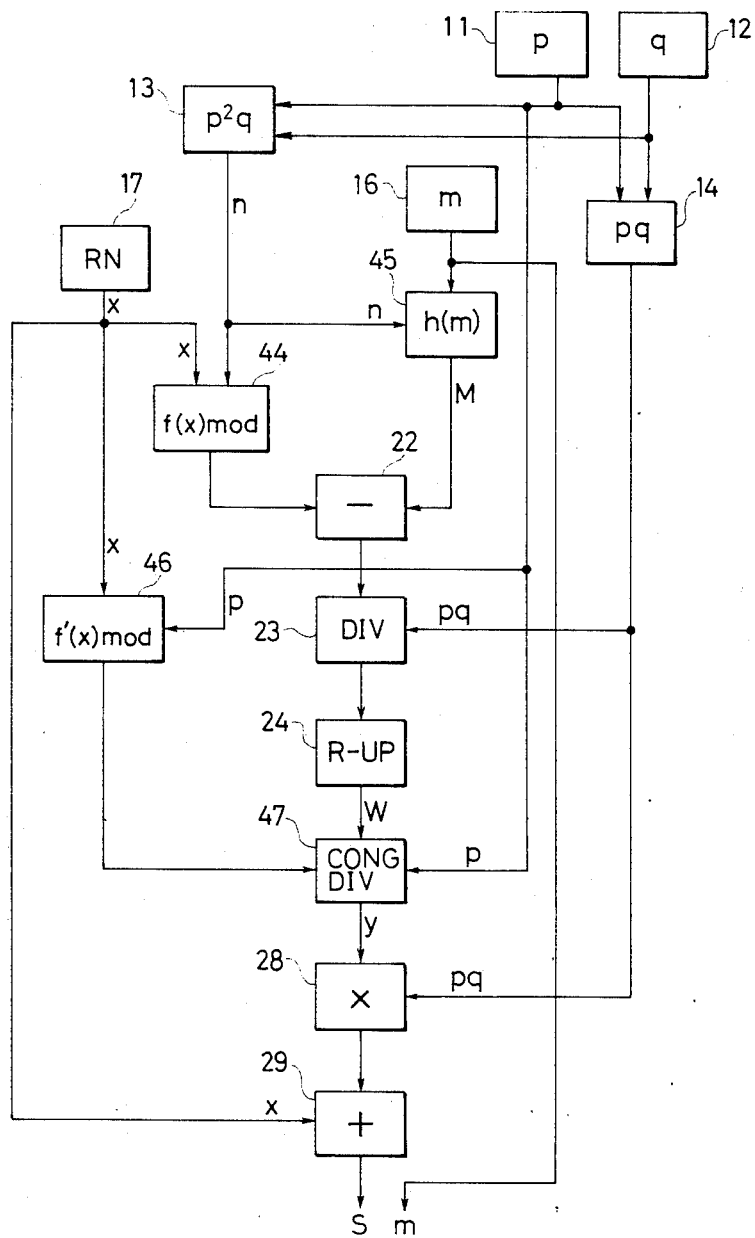
FIG. 4 is a block diagram illustrating an example of the arrangement of the signature generating side according to the present invention in the case of $f(x, m) = f(x)$.

This embodiment is identical with the first embodiment in the other points. Accordingly, the arrangement for obtaining the signature is substantially the same as that shown in FIG. 1, as illustrated in FIG. 4, in which like parts corresponding to those in FIG. 1 are identified by the same reference numerals. The random number x and the public key n are input into a congruent polynomial operating unit 44, in which an operation f(x)(mod n) is performed. On the other hand, the document m to be transmitted and the public key n are input into a hash processor 45, wherein the document m is hashed by, for instance, such an arrangement as shown in FIG. 3, obtaining $M = h(m)$. The subtractor 22 provides $M - \{f(x)(\text{mod } n)\}$, and the subtraction result is divided by pq in the divider 23. The result of the division is subjected to an operation for obtaining, by the round-up operating unit 24, the smallest integer W equal to or greater than the division result from the divider 23 as defined by expression (20). Further, the random number x and the secret key p are supplied to a congruent polynomial operating unit 46, wherein an operation f'(x)(mod p) is performed, and then, a modulo-p division is conducted by a congruent divider 47 using the output from the unit 46, thereby obtaining y of expression (4). The subsequent procedure is the same as that employed in FIG. 1.

On the receiving side, the following verification is effected:

$$h(m) \leq f(S)(\text{mod } n) < h(m) + \delta \tag{21}$$

Figure 2:
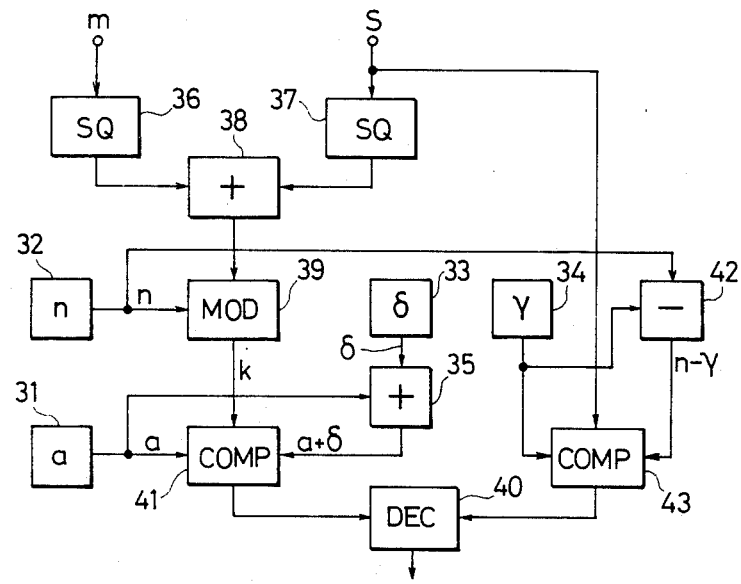
FIG. 2 is a block diagram illustrating an example of the arrangement of the side for verifying a signature generated by the arrangement shown in FIG. 1.
Figure 5:
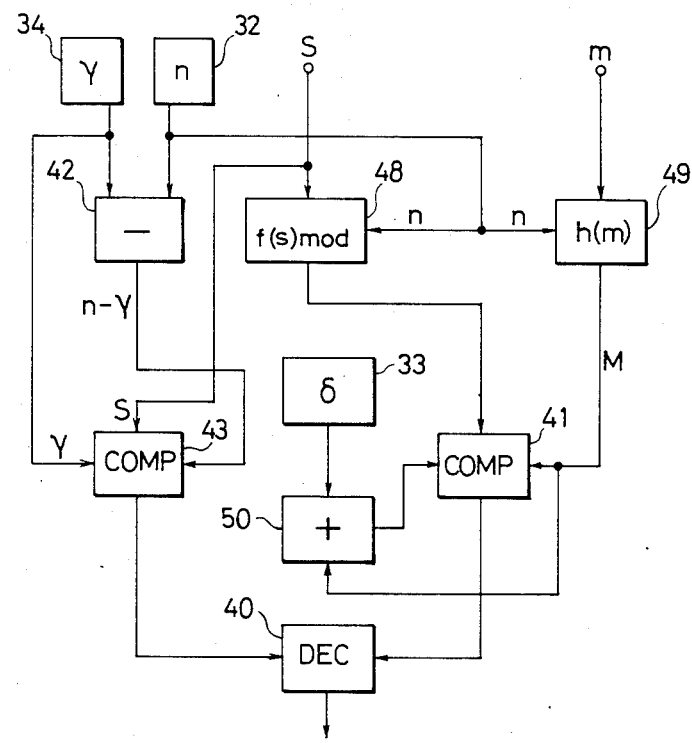
FIG. 5 is a block diagram illustrating an example of the arrangement of the side for verifying a signature generated by the arrangement shown in FIG. 4.

For example, as shown in FIG. 5, in which like parts corresponding to those in FIG. 2 are identified by the same reference numerals, the received signature S is subjected to an operation of a modulo-n polynomial f(S)(mod n) by a congruent polynomial operating unit 48, and the received document m is hashed by a hash processor 49 of the same construction as the hash processor 45 on the transmitting side, obtaining $M = h(m)$. The sum of the hashed document M and the public key $\delta$ is obtained by an adder 50, and it is decided by the comparator 41 whether the condition of expression (21) is satisfied or not. The other operations are identical with those in the case of FIG. 2.

Subtracting h(m) from each side of expression (21) and dividing by $\delta$ give $$0 \leq \frac{-h(m) + \{f(S)(\text{mod } n)\}}{\delta} < 1 \tag{22}$$

Accordingly, when expression (21) is satisfied, the middle term in expression (22) is between 0 and 1, and it follows that $$\left[\frac{-h(m) + \{f(S)(\bmod n)\}}{\delta}\right] = 0 \quad (23)$$

which satisfies expression (6) mentioned previously. Therefore, the verification by expression (21) is correct, and in this case, it is possible to perform the verification by expression (22) or (23).

THIRD EMBODIMENT

Next, description will be given of a more generalized embodiment of the present invention. In this example, it is selected that $g(m) = -h(m) = -M$ and $f(x, m) = f(x)$ and, as the public keys $n$, $\delta$, $\epsilon$ and $\gamma$, those described in PRINCIPLES OF THE INVENTION are used.

At first, W and V are obtained which satisfy the following conditions:

$$Z \leq Wpq + V\epsilon\delta < Z + \delta \quad (1)$$

$$Z = h(m) - \{f(x)(\bmod n)\} \quad (24)$$

Figure 6:
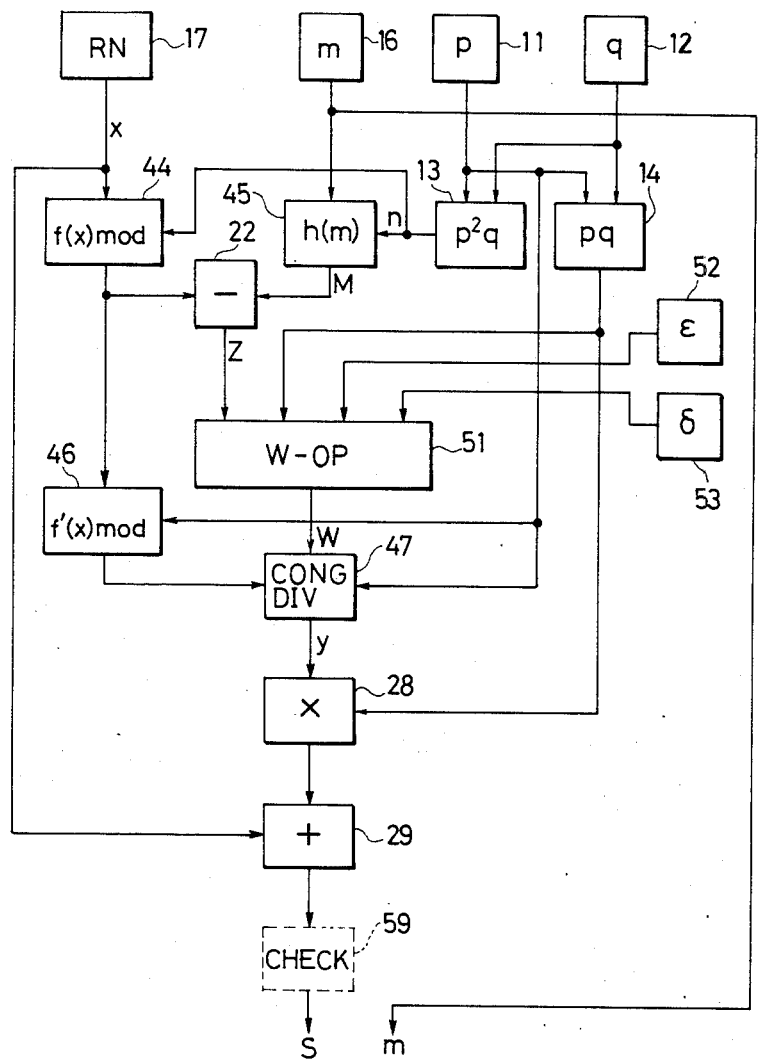
FIG. 6 is a block diagram showing an example of the arrangement of the signature generating side in a more generalized case.

The aforementioned expressions (4) and (5) are executed using this W. That is, as shown in FIG. 6 in which like parts corresponding to those in FIG. 4 are identified by the same reference numerals, $f(x)(\bmod n)$ for the random number x is obtained by the congruent polynomial operating unit 44, and the document m is hashed by the hash processor 45 into $M = h(m)$. The difference, $Z = h(m) - \{f(x)(\bmod n)\}$, between them is obtained by the subtractor 22 and is provided to a W-operating unit 51. To the W-operating unit 51 are also supplied pq from the multiplier 14 and the public keys $\epsilon$ and $\delta$ from the setting registers 52 and 53, obtaining W and V that meet the condition of expression (1).

Figure 7:
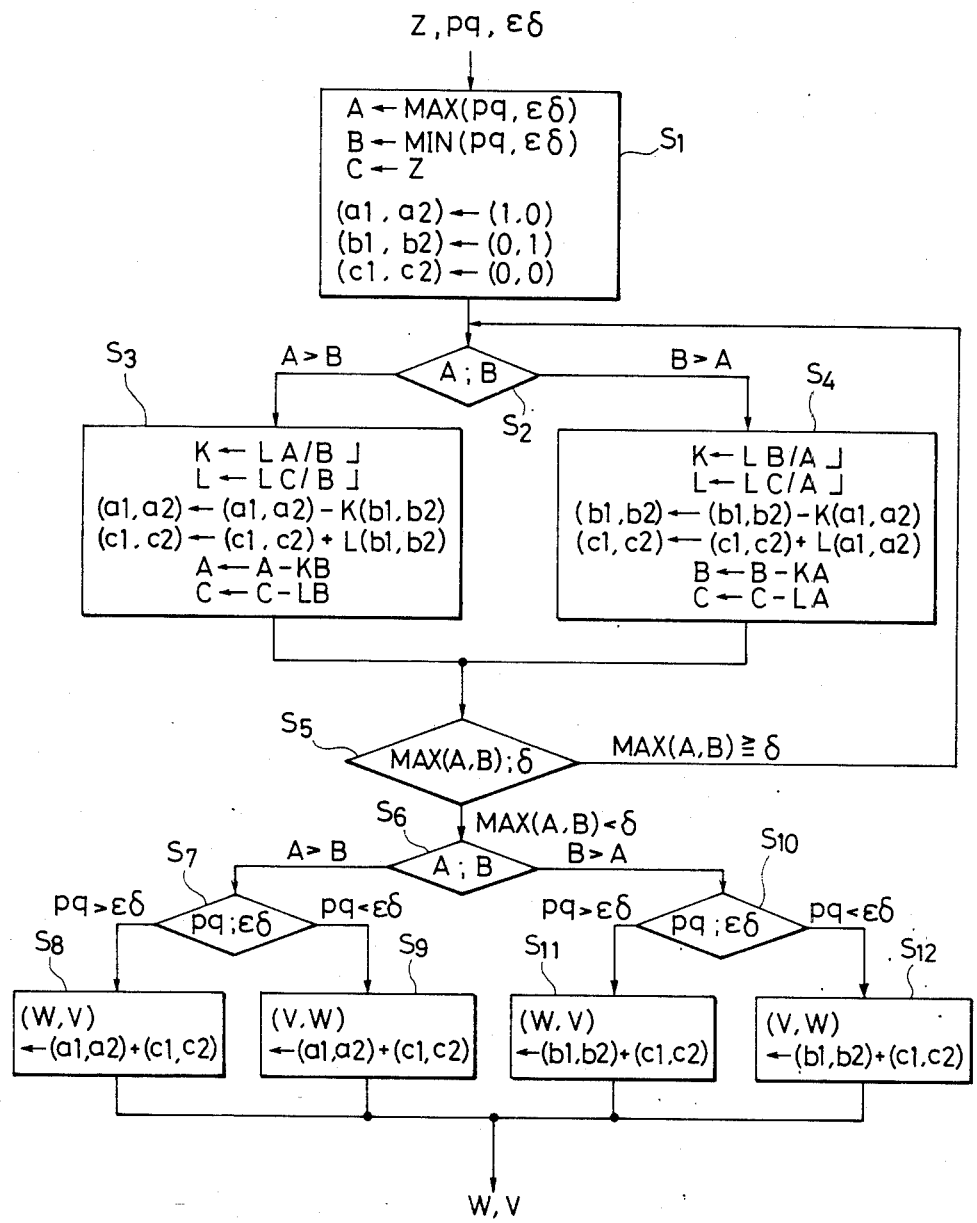
FIG. 7 is a flowchart showing an example of a processing algorithm in a W operating unit 51 in FIG. 6.

FIG. 7 shows an example of the algorithm for obtaining W and V at the W-operating unit 51. This algorithm utilizes the extended Euclidean algorithm for obtaining the greatest common divisor of A and B. In step $S_1$ the greater one of pq and $\delta$ is set in a variable A and the smaller one in a variable B, Z in a variable C, 1 and 0 in variables $a_1$ and $a_2$, respectively, 0 and 1 in variables $b_1$ and $b_2$, respectively, and 0 and 0 in variables $c_1$ and $c_2$, respectively. In step $S_2$, it is decided which of A and B is greater than the other, and if A is larger than B, then in step $S_3$ [A/B] is set in a variable K and [C/B] in a variable L. Then, $a_1 - Kb_1$ is set in the next $a_1$ and $a_2 - Kb_2$ in the next $a_2$, and these are indicated in the form of $(a_1, a_2) = (a_1, a_2) = K(b_1, b_2)$. In a similar manner, $(c_1, c_2) + L(b_1, b_2)$ is obtained and set in the next $c_1$ and $c_2$, and $A - KB$ is set in the next A and $C - LB$ in the next C. On the other hand, if it is decided in step $S_2$ that A is smaller than B, then [B/A] is set in K and [C/A] in L in step $S_4$, and by using them, $(b_1, b_2) - K(a_1, a_2)$ is set in the next $(b_1, b_2)$, $(c_1, c_2) + L(a_1, a_2)$ in the next $(c_1, c_2)$, $B - KA$ in the next B and $C - LA$ in the next C. In step $S_5$ following step $S_3$ or $S_4$, the greater one of A and B is compared with $\delta$, and if the former is equal to or larger than the latter, the process returns to step $S_2$. When the former is smaller than the latter, A and B are compared with each other in step $S_6$. If A is greater than B, then the process proceeds to step $S_7$, in which pq and $\epsilon\delta$ are compared with each other, and if the former is larger than the latter, $a_1 + c_1$ is set in W in step $S_8$. If the former is smaller than the latter, then $a_2 + c_2$ is set in W in step $S_9$. In the event that B is greater than A in step $S_6$, the process proceeds to step $S_{10}$, in which pq and $\epsilon\delta$ are compared with each other, and when the former is larger than the latter, $b_1 + c_1$ is set in W in step $S_{11}$, and if the former is smaller than the latter, the $b_2 + c_2$ is set in W.

With respect to W thus obtained, expressions (4) and (5) are executed, and in this case, they need only to be executed in the same manner as in the case of FIG. 4, as shown in FIG. 6.

The verification on the receiving side can be done by executing the following expression (25) corresponding to expression (6):

$$\left\lfloor \frac{-h(m) + \{f(S)(\bmod n)\}}{\delta} \right\rfloor = 0 \; (\bmod \epsilon) \quad (25)$$

Figure 8:
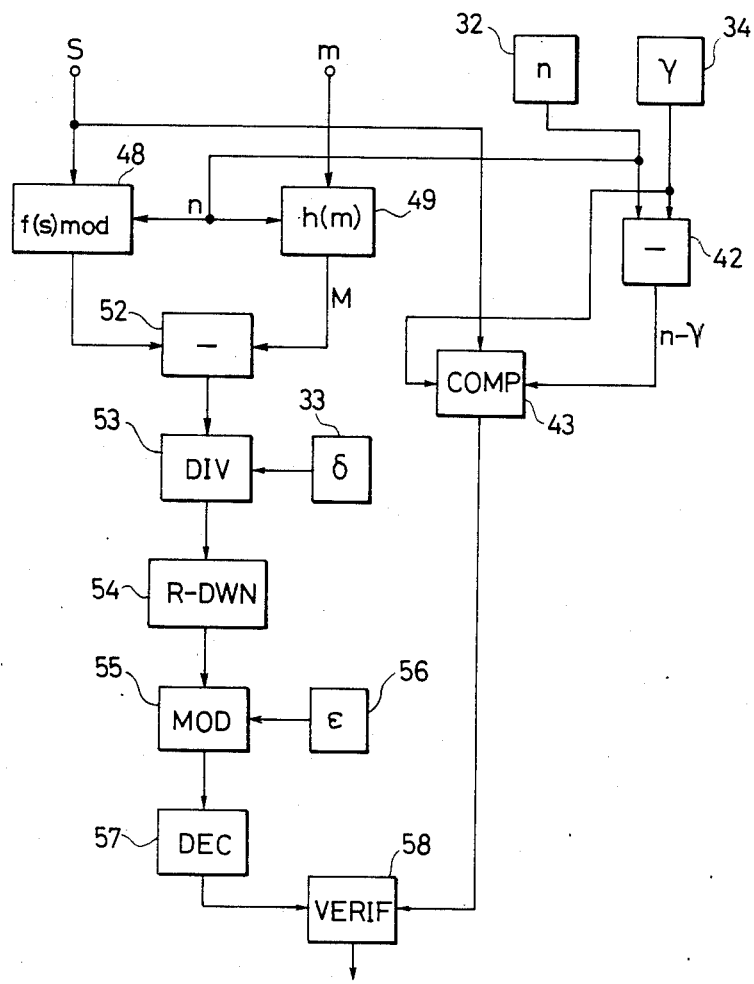
FIG. 8 is a block diagram illustrating an example of the arrangement of the side for verifying a signature generated by the arrangement shown in FIG. 6.

For instance, as shown in FIG. 8 in which like parts corresponding to those in FIG. 5 are indentified by the same reference numerals, $f(S)(\bmod n)$ is obtained by the congruent polynomial operating unit 48 for the received signature S, and the received document m is hashed by the hash processor 49, and further, their subtraction $-h(m) + \{f(x)(\bmod n)\}$ is carried out by a subtractor 52. The result of the subtraction is divided by $\delta$ at a divider 53, and the quotient is subjected to an operation in a rounddown operating unit 54 for obtaining the greatest integer equal to or smaller than the given quotient. The obtained integer is subjected to a modulo-$\epsilon$ operation by a residue operating unit 55 using the public key $\epsilon$ that is applied thereto from a setting register 56. It is decided by a decision circuit 57 whether the result of modulo-$\epsilon$ operation is zero or not, and in the case where the result is decided to be zero and the received signature S meets the condition $\gamma \leq S \leq n - \gamma$ in the comparator 43, a verification output circuit 58 provides an output indicating the validity of the received document m and signature S.

Incidentally, in the second embodiment, the verification by expression (23) can be achieved through the use of the arrangement shown in FIG. 8 without any modification, and in this case, since the result of division by the divider 53 is always between 0 to 1, the residue operating unit 55 and the setting register 56 may also be dispensed with.

MODIFIED FORMS

While in the above it is requisite for the secret key information that p is greater than q, it is also possible to make p smaller than q. In this case, as indicated by the broken line typically in FIG. 6, the signature S obtained with the arrangement of transmitting side shown in FIGS. 1, 4 or 6 is checked, in advance of transmission, by a checking part 59 as to whether the result of verification on the receiving side will meet the specified condition, that is, any one of expressions (17), (18) and (19) in the case of the arrangement of FIG. 1 being used, any one of expressions (20), (22) and (23) in the case of the arrangement of FIG. 4, or expression (25) in the case of the arrangement of FIG. 6. If the condition is satisfied, then the signature S is transmitted, but if not, the same signature generating procedure is repeated, that is, the random number x is re-selected to obtain the signature S until it will pass the check by checking part 59. Under the condition that p is smaller than q, it is possible to define such that $\delta = pq + \phi$, where $\phi$ is a random number having the order of $pq/10$. It is also possible to define such that $\delta = pq - \phi$; in this case the generation of the signature S is repeated until it will pass the above examination by the checking part 59.

Moreover, although in the above the random number x is selected to satisfy $1 \leq x \leq pq-1$, it is also possible to use the random number x that does not satisfy this requirement. Further, the modulo p in expression (4) can also be changed to the modulo n. In either case, it is necessary only to subject signature S obtained by expression (5) to the modulo-n operation for outputting it. In the event that the degree of the congruent polynominal f(x, m) with respect to x is higher than $\alpha(n^{1/\alpha} \approx 1)$ or so, the public key $\gamma$ is not needed. That is, the verification by expression (7) on the receiving side can be dispensed with. Also it is possible to provide a setting register for setting n instead of the multiplier 13, to provide a setting register for setting pq in place of the multiplier 14 and to omit the q setting register 12.

Further, the verification on the receiving side can also be achieved by checking whether or not a predetermined number of consecutive bits are "0" which starts at a predetermined bit position of the binary value of the operation result obtained by the aforesaid congruent polynominal. That is, in the second embodiment described above, the public keys $\delta$ and $\gamma$ are each selected to be given in the form of a power of 2 as follows:

$$\delta = 2^d = \theta(n^{\frac{2}{3}})$$

$$\gamma = 2^r = \theta(n/T)$$

When the following expressions (26) and (27) both hold based on the above relations and expression (23), the received document m and signature S are decided as valid.

$$[f(S)(\mod n) - h(m)]^d = \phi \quad (26)$$

$$[S]^r \neq \phi, \ [n-S]^r \neq \phi \quad (27)$$

where $[A]^d$ means the number of bits $(|n|-d)$ which succeed the most significant bit of A represented in binary form and $\phi$ a bit string of an arbitrary length entirely composed of bits "0". In the above $|n| = [\log_2 n]$.

Also in the third embodiment described above, the public keys $\delta$, $\epsilon$ and $\gamma$ are each defined as a power of 2 as follows:

$$1 \leq \delta = 2^d < \theta(n^{\frac{2}{3}})$$

$$\epsilon = 2^e = \theta(n^{\frac{1}{3}})$$

$$\gamma = 2^r = \theta(n/T)$$

When the following expression (28) holds based on the above three relations, expression (25) can be regarded to hold.

$$[f(S)(\mod n) - h(m)]_e^d = \phi \quad (28)$$

where $[A]_e^d$ means e consecutive bits starting at a $(d+1)$th bit from the least significant bit of A represented in binary form. Accordingly, when expressions (28) and (27) both hold, the received document m and signature S are decided as valid.

The arrangement for the signature generation and verification is not limited specifically to one that is entirely formed by hardware, as described above, but may also be partly formed by a microprocessor, and further, the entire processing can be performed by an electronic computer.

EFFECT OF THE INVENTION

Figure 9:
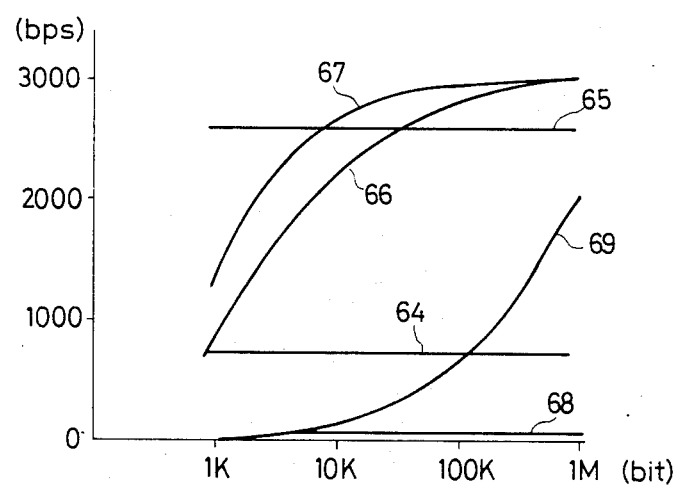
FIG. 9 is a graph showing, by way of example, signature generating speeds of respective systems relative to the length of a document.

For the purpose of showing that the signed document transmission system of the present invention permits higher-speed processing than the conventional RSA method, FIG. 9 shows processing speeds by the two methods in the case of $f(x, m) = x^2$. In this case, the processing was executed by a 16-bit microprocessor, the instruction execution time was 2.4 μsec, the basic multiplication time 20 μsec and one block was 640-bit, that is, $|n| = 640$ bits. In FIG. 9, the abscissa represents the length (in bit) of the document m and the ordinate the processing speed (bps), and the curve 64 indicates the signature generation speed by the present invention, the curve 65 its verification speed, the curve 66 the signature generation speed by the present invention in the case of utilizing the hashing, the curve 67 its verification speed, the curve 68 the signature generation speed or verification speed by the conventional RSA method and the curve 69 the signature generation speed or verification speed by the conventional Davies' hybrid system, that is, in the case of the conventional hashing method. Incidentally, n in the system of this invention and n in the RSA method and the hybrid system are 640-bit. FIG. 9 indicates that the system of the present invention is higher in processing speed than the prior art systems. Especially, in ordinary document transmission, the document m is several tens of kilo-bits at the longest, and even if the document length is 100K bit, it will be understood from FIG. 9 that the signature generation speed and the verification speed by the present invention are both higher than that by the conventional hybrid system and that the present invention is therefore a considerable improvement over the prior art. According to the present invention, the processing speed is more than 100 times higher than the conventional RSA method, and the signature generation/verification can be achieved in several seconds using a 16-bit microprocessor.

With the present invention, the secret keys p and q can be kept in safety by selecting the public key n on the order of 200-digit decimal numbers, and this provides substantially the same safety as would be ensured when the public key n in the prior RSA method is on the order of 200-digit decimal numbers. According to the present invention, the secret key information p and q may be 430 bits long and the public key information 640 bits long. By selecting the values of the public keys $\delta$ and $\gamma$ to be given as $2^d$ and $2^r$, respectively, d and r can each be represented by data of about 20 bits, so that the amount of data for the public key information can be decreased by storing them in the form of d and r instead of $\delta$ and $\gamma$. In addition, by fixing the value of the public key n in the system, the public keys $\delta$ and $\gamma$ can also be fixed and they need not be included in the public key information. On the other hand, according to the RSA method, the secret key information is 640 bits in length and the public key information 1280 bits long. According to the present invention, since the public key information is shorter than in the case of the RSA method, as mentioned above, more subscriber identification data and public key information can be accommodated in a register book of the same storage capacity.

It will be apparent that many modifications and variations may be effected without departing from the scope of the novel concepts of the present invention.

What is claimed is:

1. A signed document transmission method comprising the steps of:

determining, on the transmitting side, integer values W and V satisfying $$Z \leq Wpq + V\epsilon\delta < Z + \delta$$

for $$Z = -g(m) - \{f(x, m)(\bmod n)\}$$

where $\epsilon$ and $\delta$ are public keys, p and q are secret keys of prime numbers, n is a public key given by $n = p^2q$, x is a random number, m is a document to be transmitted, g(m) is an arbitrary function with respect to m, f(x, m) is a polynomial given by $$f(x, m) = \sum_{i=0}^{I} f_i(m) \cdot x^i$$

where $I \geq 2$ and $f_i(m)$ is an arbitrary function with respect to m;

generating a signature S as given by $S = x + ypq$, where y is an integer given by a congruent division $y = W/F'(X, n) \pmod{p}$, and f'(x, m) is a differentiation of f(x, m) with respect to x;

transmitting the document m and the signature S;

obtaining, on the receiving side, a congruent polynomial f(S, m) (mod n) using the signature S in place of x in the polynomial f(x, m), and the document m and the public key n; and verifying the validity of the received document m and the signature S when $$\left\lfloor \frac{g(m) + \{f(S, m) (\bmod n)\}}{\delta} \right\rfloor = 0 \, (\bmod \, \epsilon)$$

is satisfied, where [A] represents the greatest integer equal to or smaller than A.

2. A signed document transmission method comprising the steps of:

determining, on the transmitting side, an integer value W in accordance with the expression $$W = \left\lceil \frac{-g(m) - \{f(x, m) (\bmod n)\}}{pq} \right\rceil$$

where $\delta$ is a public key, p and q are secret keys of prime numbers, n is a public key given by $n = p^2q$, x is a random number, m is a document to be transmitted, g(m) is an arbitrary function with respect to m, f(x, m) is a polynomial given by $$f(x, m) = \sum_{i=0}^{I} f_i(m) \cdot x^i$$

where $I \geq 2$ and $f_i(m)$ is an arbitrary function with respect to m, and [A] represents the smallest integer equal to or greater than A;

generating a signature S as given by $S = x + ypq$, where y is an integer given by a congruent division $y = W/f'(x, m) \pmod{p}$, and f'(x, m) is a differentiation of f(x, m) with respect to x;

transmitting the document m and the signature S;

obtaining, on the receiving side, a congruent polynomial f(S, m) (mod n) using the signature S in place of x in the polynomial f(x, m), and the document m and the public key n; and verifying the validity of the received document m and the signature S when an inequality equivalent to $$-g(m) \leq f(S, m)(\bmod n) < -g(m) + \delta$$

is satisfied.

3. A signed document transmission method comprising the steps of determining, on the transmitting side, an integer value W based on g(m) and a congruent polynomial f(x, m) (mod n), where x is an integer random number, m is a document to be transmitted, n is a public key given by $n = p^2q$, p and q are secret keys of prime numbers, g(m) is an arbitrary function with respect to m, f(x, m) is a polynomial given to $$f(x, m) = \sum_{i=0}^{I} f_i(m) \cdot x^i, f_i(m)$$

is an arbitrary function with respect to m, and I is an integer equal to or greater than 2;

generating a signature S as given by $S = x + ypq$, where y is a congruent division of W and a differentiation f'(x, m) of f(x, m) with respect to x;

transmitting the document m and the signature S;

obtaining, on the receiving side, a congruent polynomial f(S, m) (mod n) using the signature S in place of x in the polynomial f(x, m), and the document m and the public key n; and verifying the validity of the document m and the signature S based on the calculation results of F(S, m) (mod n) and g(m).

4. A signed document transmission system according to claim 1 wherein the public key $\delta$ is selected within a range as given by $1 \leq \delta \leq \theta(n^{\frac{2}{3}})$, where $\theta(n^{\frac{2}{3}})$ indicates the order of $n^{\frac{2}{3}}$.

5. A signed document transmission system according to claim 4 wherein the public key $\epsilon$ is selected as $\epsilon = \theta(n^{\frac{1}{3}})$, where $\theta(n^{\frac{1}{3}})$ indicates the order of $n^{\frac{1}{3}}$.

6. A signed document transmission method according to claim 5 wherein the function g(m) is $-M$, M being the document m hashed by a function h(m); and the congruence polynomial f(x, m) is f(x).

7. A signed document transmission method according to claim 2 wherein the public key $\delta$ is on the order of $n^{\frac{2}{3}}$, the function g(m) is $-M$, M being the document m hashed by a function h(m), $f(x, m) = f(x)$ and the integer W is given by $$W = \left\lceil \frac{M - \{f(x) (\bmod n)\}}{pq} \right\rceil,$$

[A] indicating the smallest integer equal to or larger than A.

8. A signed document transmission method according to claim 7 wherein on the receiving side, it is checked whether $h(m) \leq f(S)(\bmod n) < h(m) + \delta$ or $0 \leq -h(m) + \{f(S)(\bmod n)\} < \delta$ is satisfied or not, and when the condition is satisfied, the received signature and document are verified to be valid.

9. A signed document transmission method according to claim 7 wherein on the receiving side, an operation $[-h(m)+\{f(S)(\bmod n)\}]$ is performed and it is checked whether the result of operation is zero or not, and if so, the received signature and document are verified to be valid.

10. A signed document transmission method according to claim 2 wherein the public key $\delta$ is on the order of $n^{\frac{2}{3}}$, the function $g(m)$ is $-a$ (where a is an integer in the range of $0 \leq a \leq n - \delta$), the congruent polynomial $f(x, m)$ is $x^2 + m^2$ and the integer W is given by $$W = \left\lceil \frac{a - \{(x^2 + m^2) \,(\bmod\, n)\}}{pq} \right\rceil ,$$

[A] indicating the smallest integer equal to or larger than A.

11. A signed document transmission method according to claim 10 wherein on the recieving side, it is checked whether a condition $a \leq (S^2+m^2)(\bmod\ n) < a+\delta$ or $0 \leq -a+\{(S^2+m^2)(\bmod\ n)\} < \delta$ is satisfied, and if it is, the received signature and document are verified to be valid.

12. A signed document transmission method according to claim 10 wherein an operation $$\left\lceil \frac{-a + (S^2 + m^2)\,(\bmod\, n)}{\delta} \right\rceil$$

is performed and it is checked whether the result of operation is zero, and if it is, the received signature and document are verified to be valid.

13. A signed document transmission method according to any one of claims 1, 2, 4, 5, 10, 11 or 12 wherein on the transmitting side the document to be transmitted is subjected to a hashing process to produce a hashed document; the hashed document is used in place of the document for the generation of the signature; the signature and the non-hashed document are transmitted; on the receiving side the received document is subjected to the same hashing process as that used on the transmitting side, to produce a hashed received document; and the hashed received document is used in place of the received document for verification of the signature.

14. A signed document transmission method according to any one of claims 1, 2, 6, 7 or 10 wherein the secret keys p and q are selected so that $p > q$.

15. A signed document transmission method according to any one of claims 1, 2, 6, 7 or 10 wherein the secret keys p and q are selected so that $p < q$.

16. A signed document transmission method according to claim 13 wherein the procedure for the signature generation is repeated on the transmitting side until the same condition as that for the signature verification on the receiving side is satisfied.

17. A signed document transmission method according to claim 16 wherein $pq - \phi$ is used as the public key $\delta$, where $\phi$ is a random number of the order of $pq/10$.

18. A signed document transmission method according to claim 15 wherein $pq + \phi$ is used as the public key $\delta$, where $\phi$ is a random number of the order of $pq/10$.

19. A signed document transmission method according to any one of claims 1, 2, 6, 7 or 10 wherein $\gamma = \theta(n/T)$ (where T is a value approximately in the range of $10^{10}$ to $10^{30}$) is provided as a public key, and when the received signature S is not between Y and $n - \gamma$ on the receiving side, the result of verification is ignored.

20. A signed document transmission method according to any one of claims 1, 2, 7 or 10 wherein the secret keys p and q and the random number x bear the relationship $1 \leq x \leq pq - 1$.

21. A signed document transmission method according to any one of claims 1, 2, 6, 7 or 10 wherein the random number x takes a value greater than $pq - 1$ and the result of $x + ypq$ is subjected to modulus n to obtain the signature S.

22. A signed document transmission method according to any one of claims 1, 2, 6, 7 or 10 wherein the degree $\alpha$ of the congruence polynomial with respect to the random number x is selected to be a value which meets a condition $n^{1/\alpha} \simeq 1$.

23. A signed document transmission method according to claim 1 or 2 wherein the public key $\delta$ is given as a power of 2 and the verification on the receiving side is performed by checking whether a predetermined number of consecutive bits are "0" which starts at a predetermined bit position of the binary value of the operation result obtained by the congruent polynomial.

24. A signed document transmission system comprising:
 a p-setting register for setting a secret key p (a prime number);
 a q-setting register for setting a secret key q (a prime number);
 a first multiplier for multiplying the outputs p and q of the p- and the q-setting registers to obtain pq;
 an n-generator for providing a public key $n = p^2 q$ obtained by an operation based on the outputs p and q of the p- and the q-setting registers;
 a first hash processor for hashing a document m to be transmitted to obtain a hashed document M;
 a random number generator for generating a random number x;
 a first congruent polynomial operating unit for performing a modulo-n operation of a polynomial $f(x)$ of second or higher degree using the random number x as a variable;
 a subtractor for obtaining the difference between the output of the first congruent polynomial operating unit and the hashed document M from the first hash processor;
 a divider for dividing the output of the subtractor by the output pq from the first multiplier;
 a round-up operating unit for obtaining the smallest integer equal to or larger than the output value of the divider;
 a second congruent polynomial operating unit supplied with the random number x from the random number generator, for performing a modulo-n operation of a differential value of the polynomial $f(x)$;
 a congruent divider for dividing the output W of the round-up operating unit, to modulus p, by the output of the second congruent polynomial operating unit;
 a second multiplier for multiplying the output y of the congruent divider and the output pq of the first multiplier;
 an adder for adding together the output ypq of the second multiplier and the random number from the random number generator to obtain their sum as a signature S;

means for transmitting the signature S and the document m;

means for receiving the transmitted signature S and document m;

an n-setting register for setting the public key n;

a δ-setting register for setting a public key δ of the order of $n^{\frac{2}{3}}$;

a third congruent polynomial operating unit for performing a modulo-n operation of the polynomial f(x) using the received signature S instead of the random number;

a second hash processor for hashing the received document by the same method as that used by the first hash processor to obtain hashed data M; and a comparator supplied with the result of the operation f(S)(mod n) from the third congruent polynomial operating unit, the hashed data M from the second hash processor and the output δ from the δ-setting register, for deciding whether they meet a condition $M \leq f(x)(\mod n) < M + \delta$ and, when it is satisfied, producing information to that effect.

25. A signed document transmission system comprising:

a p-setting register for setting a secret key p (a prime number);

a q-setting register for setting a secret key q (a prime number);

a first multiplier for multiplying the outputs p and q from the p- and the q-setting registers to obtain pq;

an n-generator for generating a public key $n = p^2 q$ obtained by an operation based on the outputs p and q from the p- and the q-setting registers;

a first hash processor for obtaining a hashed document M by hashing a document m to be transmitted;

a random number generator for generating a random number x;

a first congruent polynomial operating unit for performing a modulo-n operation of a polynomial f(x)(mod n) of second or higher degree using the random number x as a variable;

a subtractor for obtaining the difference between the output of the first congruent polynomial operating unit and the hashed document M from the first hash processor;

a first ε-setting register for setting a public key ε of the order of $n^{\frac{1}{3}}$;

a first δ-setting register for setting a public key δ of the order between 1 and $n^{\frac{1}{3}}$;

a W-operating unit supplied with the output Z of the subtractor, the output pq of the first multiplier, the output ε of the first ε-setting register and the output δ of the first δ-setting register, for obtaining W which meets the following conditions $$Z \leq Wpq + V\epsilon\delta < Z + \delta$$

$$Z = -g(m) - \{f(x)(\mod n)\};$$

a round-up operating unit for obtaining the smallest integer equal to or larger than the output value of the W-operating unit;

a second congruent polynomial operating unit supplied with the random number x from the random number generator, for performing a modulo-p operation of a differential value of the polynomial f(x);

a congruent divider for dividing the output W of the W-operating unit by the output of the second congruent polynomial operating unit to modulus p;

a second multiplier for multiplying the output y of the congruent divider and the output pq of the first multiplier;

an adder for adding together the output ypq of the second multiplier and the random number x from the random number generator to obtain a signature S;

means for transmitting the signature S and the document m;

means for receiving the transmitted signature S and document m;

an n-setting register for setting the public key n;

a second ε-setting register for setting the public key ε;

a second δ-setting register for setting the public key δ;

a third congruent polynomial operating unit for performing a modulo-n operation of the polynomial f(X) using the received signature S instead of the random number x;

a second hash processor for hashing the received document by the same method as that used by the first hash processor to obtain hashed data M;

a second subtractor for obtaining the difference, f(S)(mod n)−M, between the output M of the second hash processor and the output f(S)(mod n) of the third congruent polynomial operating unit;

a divider for dividing the output of the second subtractor by the output δ of the second δ-setting register;

a round-up operating unit for obtaining the smallest integer equal to or larger than the output of the divider;

a residue operating unit for performing a modulo-ε operation of the output of the round-up operating unit by the output ε of the second ε-setting register; and a circuit for deciding whether the output of the residue operating unit is zero or not and for outputting the decision result.

* * * * *